(12) United States Patent
Okumura et al.

(10) Patent No.: US 7,474,598 B2
(45) Date of Patent: Jan. 6, 2009

(54) OPTICAL REPRODUCING DEVICE THAT CONTROLS THE STRENGTH OF THE LIGHT BEAM DURING REPRODUCTION

(75) Inventors: Tetsuya Okumura, Neyagawa (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 574 days.

(21) Appl. No.: 10/082,466

(22) Filed: Feb. 25, 2002

(65) Prior Publication Data
US 2002/0145956 A1 Oct. 10, 2002

(30) Foreign Application Priority Data
Feb. 28, 2001 (JP) .............................. 2001-055066

(51) Int. Cl.
*G11B 7/135* (2006.01)
(52) U.S. Cl. ..................................... 369/47.5; 369/116
(58) Field of Classification Search ................ 369/47.5, 369/116; *G11B 7/125, 7/00, 7/135; B11B 7/00, B11B 7/135*
See application file for complete search history.

(56) References Cited

U.S. PATENT DOCUMENTS

| | | | | |
|---|---|---|---|---|
| 5,617,400 A | * | 4/1997 | Fuji ........................... | 369/47.5 |
| 5,825,742 A | * | 10/1998 | Tanaka et al. ............. | 369/59.11 |
| 6,229,659 B1 | * | 5/2001 | Watkins et al. ................ | 360/48 |
| 6,243,344 B1 | * | 6/2001 | Tani ......................... | 369/59.17 |
| 6,288,992 B1 | * | 9/2001 | Okumura et al. ........... | 369/47.5 |
| 6,310,846 B1 | * | 10/2001 | Fuji ......................... | 369/53.31 |
| 6,404,717 B1 | * | 6/2002 | Okumura et al. ......... | 369/59.21 |
| 6,552,967 B1 | * | 4/2003 | Tsutsui et al. ............. | 369/13.27 |
| 6,600,715 B2 | * | 7/2003 | Okumura et al. ......... | 369/275.1 |

(Continued)

FOREIGN PATENT DOCUMENTS

EP 000887790 A2 * 12/1998

(Continued)

OTHER PUBLICATIONS

MAT (machine assited translation) of JP 08-063817.*

(Continued)

*Primary Examiner*—Aristotelis M Psitos
(74) *Attorney, Agent, or Firm*—Edwards Angell Palmer & Dodge LLP; David G. Conlin; William J. Daley, Jr.

(57) ABSTRACT

An optical reproducing device is provided with predetermined length mark signal measurement means which measures amplitude values of a 2T mark and an 8T mark, which are a short reproducing power control mark and a long reproducing power control marks, respectively, from information data recorded in an magneto-optical disk. Reproducing power of a light beam is controlled by a laser power control circuit, based on the amplitude values of the 2T mark and the 8T mark. The predetermined length mark signal measurement means detects a specific pattern including the 2T mark from a bit arrangement pattern of the information data, and measures the amplitude value of the 2T mark correponding only to the 2T mark included in the specific pattern. This structure can provide an optical reproducing device which can maintain the reproducing power at an optimum value and reduce the probability of reading errors, without reducing the utilization ratio of an optical recording medium.

20 Claims, 9 Drawing Sheets

U.S. PATENT DOCUMENTS 6,741,527 B2 * 5/2004 Okumura et al. ......... 369/13.26
6,771,576 B2 * 8/2004 Okumura et al. ......... 369/47.25
6,847,592 B2 * 1/2005 Okumura et al. ......... 369/13.54

FOREIGN PATENT DOCUMENTS

JP 08-063817 * 8/1996
JP 2000-099945 * 4/2000

OTHER PUBLICATIONS

MAT (machine assited translation) of JP 2000-099945.*
MAT (machine assisted translation of) JP 2000-99945.*

* cited by examiner

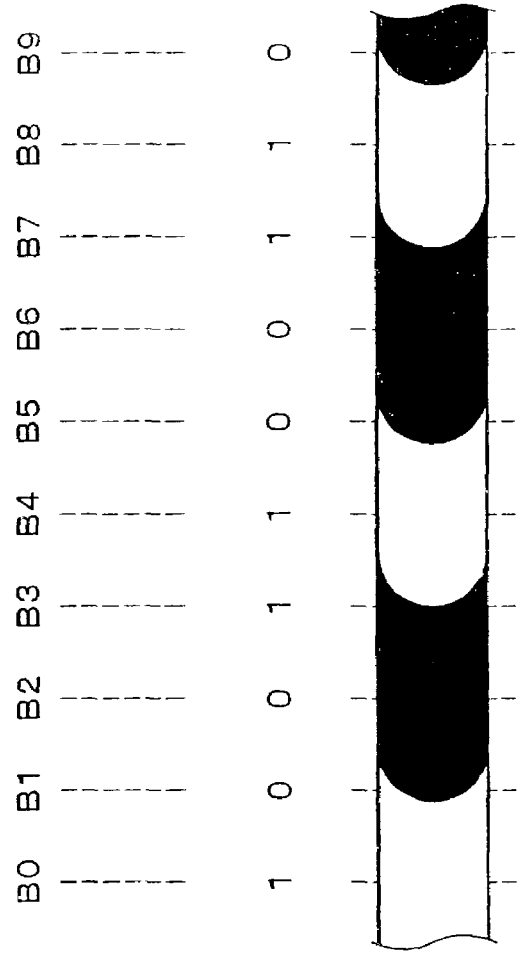
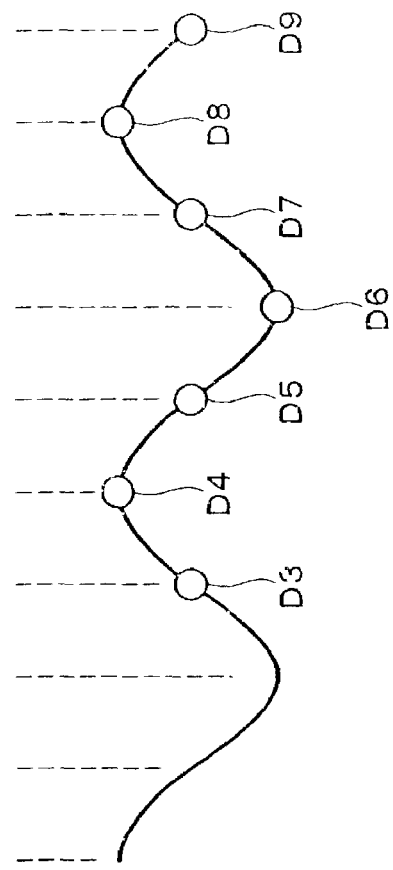
FIG. 4 (a) INFORMATION DATA BIT ROW
FIG. 4 (b) RECORD MARK
FIG. 4 (c) SAMPLING DATA OF REPRODUCTION SIGNAL WAVEFORM

SHORT MARK PATTERN
2T MARK / 2T SPACE

LONG MARK PATTERN
8T MARK / 8T SPACE

FIG. 8 (a) 2T2T2T2T
(PRIOR ART)
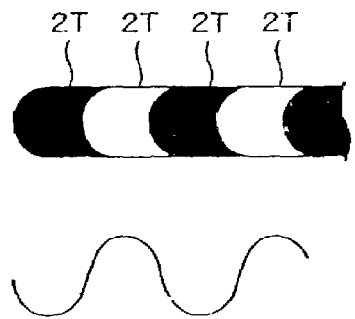
FIG. 8 (b) 3T2T2T3T
(PRIOR ART)
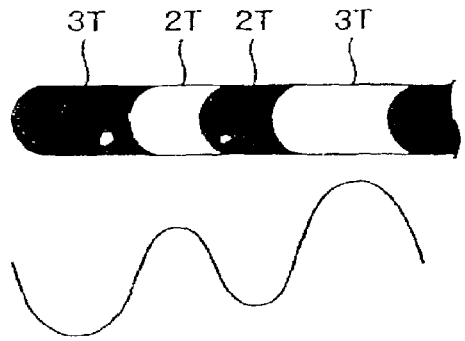
FIG. 8 (c) 4T2T2T4T
(PRIOR ART)
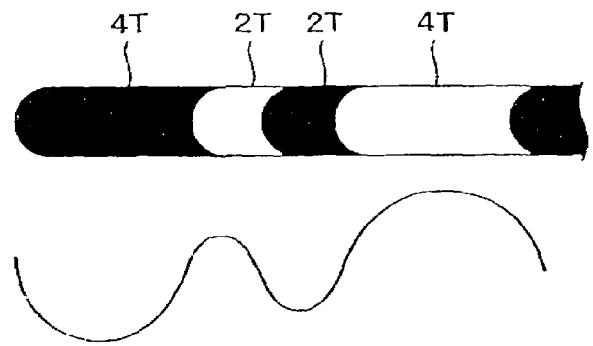
FIG. 8 (d) 5T2T2T5T
(PRIOR ART)
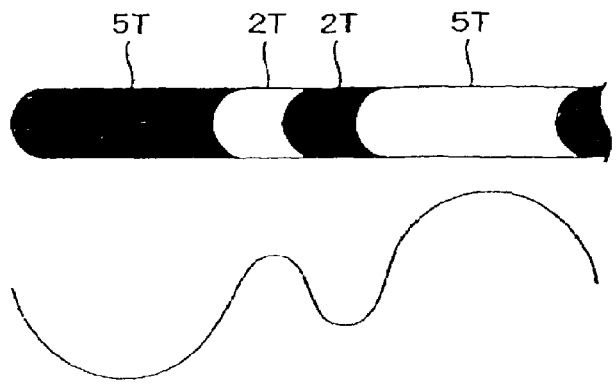

OPTICAL REPRODUCING DEVICE THAT CONTROLS THE STRENGTH OF THE LIGHT BEAM DURING REPRODUCTION

FIELD OF THE INVENTION

The present invention relates to an optical reproducing device such as an optical disk device for reproducing an optical recording medium arranged so as to improve reproducing resolution by controlling the size of a section for reading out a record mark by means of heat generated by the irradiation of a light beam, using a so-called magnetic super resolution medium. More particularly, the present invention relates to an optical reproducing device which can optimally control the irradiation strength of a light beam during reproduction.

BACKGROUND OF THE INVENTION

In magneto-optical devices as optical reproducing devices, for a magneto-optical disk of the magnetic super resolution type provided with a recording layer and an in-plane magnetized reproducing layer, a method has been proposed in which a light beam is irradiated to the magneto-optical disk from the reproducing layer side so as to reproduce a record mark smaller than a spot diameter of the light beam.

In the foregoing method, the magnetic property of the recording layer corresponding to a portion of the reproducing layer within an area irradiated by the light beam, in which the temperature rises above a predetermined level (hereinafter, the portion is referred to as an aperture), is copied onto the reproducing layer, and the magnetic property of the foregoing portion of the reproducing layer changes from in-plane magnetization to perpendicular magnetization. In this way, a record mark smaller than the spot diameter of the light beam can be reproduced.

In the foregoing method, although a driving current for generating the light beam is kept at a constant level, there are some cases where an optimal reproducing power of the light beam might vary depending on the changes in the ambient temperature during reproduction.

In this case, if the reproducing power of the light beam becomes much stronger, the aperture formed becomes too large. Consequently, the output of reproduction signals from tracks adjacent to the track being reproduced is increased, and the proportion of noise signals included in the reproduced data is increased, resulting in the increase in the probability of reading errors.

In addition, if the reproducing power of the light beam becomes much weaker, the aperture formed becomes smaller than the record mark, and the output of the reproduction signals from the track to be read is also reduced, also resulting in the increase in the probability of reading errors.

To cope with the foregoing problem, in a recording and reproducing device disclosed in Japanese Unexamined Patent Publication No. 8-63817/1996 (Tokukaihei 8-63817, published on Mar. 8, 1996), two types of reproducing power control marks having different lengths recorded on a magneto-optical disk, that is, a short mark and a long mark, are reproduced, and reproducing power is controlled in such a manner that a ratio between amplitudes of reproduction signals of these two marks gets close to a predetermined value. This arrangement allows the reproducing power of the light beam to be kept at an optimum value, reducing the probability of reading errors.

More specifically, the short mark is smaller than an aperture diameter. Therefore, by increasing the reproducing power and increasing the aperture diameter, the short mark occupies a smaller area in an aperture, resulting in a reduction in an amplitude of the short mark. However, when the reproducing power is increased, the quantity of light also increases, which acts in a direction to increase the amplitude of the short mark.

On the other hand, when reproducing the long mark, which is greater than the aperture diameter, the long mark always occupies 100% of the area of the aperture even if the aperture diameter changes depending on the reproducing power of the light beam. Therefore, it can be considered that a change in an amplitude of the long mark with respect to a change in the reproducing power corresponds to the amount of change in the quantity of light. Thus, a value obtained by dividing the amplitude of the short mark by the amplitude of the long mark, that is, a ratio between the amplitudes of the long and short marks obtained by normalizing the amplitude of the short mark by the amplitude of the long mark, becomes a value corresponding to the amount of change in the aperture diameter. Consequently, to keep the ratio between the amplitudes of the long and short marks constant means to keep the aperture diameter constant. As a result, by maintaining the ratio between the amplitudes of the long and short marks constant, it becomes possible to control the reproducing power so as to be always optimized with respect to an ambient temperature or a tilt.

Next, a method for optimizing the reproducing power of this kind will be specifically explained.

First, FIG. 5 shows a structure of an optical reproducing device, and FIG. 6 schematically shows a structure of a magneto-optical disk 220 reproduced by the optical reproducing device. A sector 300, which is one unit of a recording area in the magneto-optical disk 220, is structured so as to include an address area 301 for indicating the position of the sector 300, a reproducing power control area 302 for recording reproducing power control marks, and a data recording area 303 for recording digital information data.

The reproducing power control marks are constituted by a short mark pattern in which marks each having a length of 2T are provided at spaces each having a length of 2T as shown in FIG. 7(a), and a long mark pattern in which marks each having a length of 8T are provided at spaces each having a length of 8T as shown in FIG. 7(b).

More specifically, T represents a channel bit length, and the short mark pattern shown in FIG. 7(a) is structured such that a mark with a bit length of 2×T shown as a 2T mark and a space with a bit length of 2×T shown as a 2T space are repeated alternately. Besides, the long mark pattern shown in FIG. 7(b) is structured such that a mark with a bit length of 8×T shown as an 8T mark and a space with a bit length of 8×T shown as an 8T space are repeated alternately.

Therefore, for example, when the channel bit length is 1 bit, in binary notation, the short mark pattern specifically represents a pattern in which a bit arrangement of "1100" is repeated, and the long mark pattern specifically represents a pattern in which a bit arrangement of "1111111100000000" is repeated. These short mark pattern and long mark pattern are recorded in the reproducing power control area 302.

In the foregoing optical reproducing device, as shown in FIG. 5, when light emitted from a semicondoctor laser 202 reaches the address area 301 of the sector 300 on the magneto-optical disk 220, a target sector address is recognized by an address decoder (not shown). Next, the emitted light is directed to the reproducing power control area 302, then light reflected from a short mark pattern and light reflected from a long mark pattern, the patterns being recorded in the area, are converted to reprodution signals by a photo diode 203, then the reproduction signals are subjeted to A/D conversion by an A/D converter 205.

The converted signals are respectively inputted to a short mark amplitude detection circuit 221 and a long mark amplitude detection circuit 222. Then, an amplitude value of a short mark in the short mark pattern and an amplitude value of a long mark in the long mark pattern are obtained respectively. Incidentally, the A/D conversion is carried out at timings by clocks extracted from the reproduction signals by a reproducing clock extracting circuit 204 constituted by a PLL (Phase Locked Loop).

The amplitude value of the short mark, that is, the 2T mark, in the short mark pattern and the amplitude value of the long mark, that is, the 8T mark, in the long mark pattern obtained in such a manner are respectively inputted to a division circuit 210. The division circuit 210 outputs an amplitude ratio calculated by Amplitude ratio=amplitude value of the 2T mark +amplitude value of the 8T mark.

The amplitude ratio and a target amplitude ratio are compared by a differential amplifier 211, and a laser power control circuit 212 outputs a driving current for the semiconductor laser 202 in such a manner that feedback is applied in a direction to reduce the difference between the two ratios.

After laser light is controlled so as to provide an optimum reproducing power in such a manner, the emitted light is directed to the data recording area 303, and a read-out reproduction signal is inputted to a binarization processing circuit 213, then information data reproduced with a low error rate is outputted. When the emitted light reaches the next sector 300, the same processing is repeated, and the reproducing power is set again to a new optimum level.

In this manner, by providing the area for recording the reproducing power control marks in each sector 300, dispersedly on the whole, and detecting the quantity of the reproduction signal for reproducing power control at each sector 300, the reproducing power can respond at a short time interval, and follow fluctuations in an optimum reproducing power caused in a short time.

However, the foregoing conventional optical reproducing device has a disadvantage that, since the reproducing power control area 302 should be provided in each sector 300, the area for recording information data is reduced by the amount of the reproducing power control area 302, resulting in a decrease in the utilization ratio of an optical recording medium.

Consequently, another method can be considered in which the reproducing power control area 302 is not provided in each sector 300, but instead, the 2T mark and the 8T mark are detected from a bit arrangement pattern of information data recorded in the data recording area 303, and amplitude values are obtained from reproduction signals corresponding to the marks. However, this method has the following problem.

First, as shown in FIG. 8(a), a reproduction waveform of the short mark pattern constituted by only the 2T mark and the 2T space, shown as "2T2T2T2T", is expressed in a curve shown in FIG. 8(a). On the other hand, as shown in FIG. 8(b), a reproduction waveform of a mark pattern "3T2T2T3T" in which a 3T mark and a 3T space are arranged before the 2T space and after the 2T mark, respectively, is expressed in a curve shown in FIG. 8(b). As apparent from these waveforms, amplitude values of the 3T mark and the 3T space become greater than those of the 2T mark and the 2T space.

Besides, as shown in FIG. 8(c), a reproduction waveform of a mark pattern "4T2T2T4T" in which a 4T mark and a 4T space are arranged before the 2T space and after the 2T mark, respectively, is expressed in a curve shown in FIG. 8(c). As apparent from the waveform, amplitude values of the 4T mark and the 4T space become further greater than those of the 3T mark and the 3T space.

Likewise, as shown in FIG. 8(d), a reproduction waveform of a mark pattern "5T2T2T5T" in which a 5T mark and a 5T space are arranged before the 2T space and after the 2T mark, respectively, is expressed in a curve shown in FIG. 8(d). As apparent from the waveform, amplitude values of the 5T mark and the 5T space become further greater than those of the 4T mark and the 4T space.

Here, since the 2T mark is smaller than the aperture diameter of the light beam, its reproduction waveform suffers waveform interference from a mark or a space before and after the 2T mark. The degree of the waveform interference differs depending on the length of the mark or the space before and after the 2T mark.

An actual result confirmed by the measurement using reproduction signals read out from the magneto-optical disk 220 is shown in FIG. 9. The horizontal axis represents the respective mark patterns shown in FIGS. 8(a) through 8(d), and the vertical axis represents the measurement results of the amplitude values of the 2T marks in the reproduction signals of the respective mark patterns.

It can be confirmed also from this measurement result that the amplitude value of the 2T mark varies depending on the length of a space before and after the 2T mark. That is, as the length of the space before and after the 2T mark increases as 3T, 4T, the amplitude value of the 2T mark becomes greater, influenced by the space of a longer length.

In this manner, since the amplitude value of the 2T mark varies depending on the length of the space before and after the 2T mark, individual amplitude values of the 2T marks have considerable variations. As a result, in order to obtain an amplitude value of the 2T mark from a reproduction waveform of the 2T marks included in the bit arrangement pattern of the information data, it is clearly preferable to average the individual 2T mark amplitude values obtained by detecting a plurality of the 2T marks.

For example, when the reproducing power is controlled for each sector 300, the 2T marks are detected from all the bit arrangement patterns of the information data included in each sector 300, and the obtained 2T mark amplitude values are averaged.

In this case, however, since occurence probability of the space of each length before and after the 2T mark differs depending on each sector 300, the 2T mark amplitude value obtained by averaging also has considerable variations depending on each sector 300, resulting in causing a great error in the reproducing power controlled based on the 2T mark amplitude value.

SUMMARY OF THE INVENTION

It is therefore an object of the present invention to provide an optical reproducing device which can maintain reproducing power at an optimum value and reduce occurence probability of reading errors, without reducing the utilization ratio of an optical recording medium.

To achieve the foregoing object, an optical reproducing device in accordance with the present invention is structured so as to include:

predetermined length mark signal measurement means for measuring respective reproduction signal characteristics of a short reproducing power control mark and a long reproducing power control mark from information data recorded in an optical recording medium; and power control means for controlling reproducing power of a light beam based on the reproduction signal characteristics, wherein the predetermined length mark signal measurement means detects a specific pattern including the short reproducing power control mark from a bit arrangement pattern of the information data, and measures the reproduction signal characteristic correponding only to the short reproducing power control mark included in the specific pattern.

According to the foregoing invention, when reproducing a record mark smaller than a spot diameter of the light beam, in order to prevent fluctuations in an optimum reproducing power of the light beam due to changes in an ambient temperature during reproduction, the reproduction signal characteristics of the reproducing power control marks having short and long lengths, respectively, are measured by the predetermined length mark signal measurement means, then, the power control means controls the reproducing power of the light beam based on the reproduction signal characteristics.

Meanwhile, conventionally, a reproducing power control area is provided in each sector of the optical recording medium, and thus an area for recording the information data is reduced by the amount of the reproducing power control area, resulting in a reduction in the utilization ratio of the optical recording medium. Therefore, in order to solve the problem, it can be considered to detect a reproducing power control mark from a bit arrangement pattern of the information data. However, the bit arrangement pattern of the information data has various arrangement patterns. Besides, especially as for a reproducing power control mark having a length shorter than an aperture diameter, such as a 2T mark, a reproduction signal characteristic of the short reproducing power control mark is influenced by waveform interference caused by reproducing power control marks provided before and after the short reproducing power control mark.

Consequently, in the present invention, the predetermined length mark signal measurement means detects a specific pattern including the short reproducing power control mark from the bit arrangement pattern of the information data, and measures the reproduction signal characteristic corresponding only to the short reproducing power control mark included in the specific pattern.

As a result, since the reproduction signal characteristic such as an amplitude value corresponding only to the short reproducing power control mark is measured, this structure can avoid influence from before and after the short reproducing power control mark when measuring the amplitude value of the short reproducing power control mark. Consequently, this structure can prevent dispersion in a measured amplitude value of the short reproducing power control mark, resulting in preventing the reproducing power controlled based on the amplitude value from having a great error.

Therefore, this structure can provide an optical reproducing device which can maintain the reproducing power at an optimum value and reduce the probability of reading errors, without reducing the utilization ratio of the optical recording medium.

For a fuller understanding of the nature and advantages of the invention, reference should be made to the ensuing detailed description taken in conjunction with the accompanying drawings.

BRIEF DESCRIPTION OF THE DRAWINGS

FIGS. 4(a) through 4(c) are schematic views explaining a correspondence among an information data bit row, a record mark, and sample digital data of a reproduction waveform dealed with in the short mark pattern detection circuit and the short mark amplitude calculation circuit.

FIGS. 8(a) through 8(d) are schematic views explaining differences in reproduction waveforms depending on the lengths of marks before and after a 2T mark

DESCRIPTION OF THE PREFERRED EMBODIMENTS

Referring FIGS. 1 through 4, the following description will describe an embodiment of the present invention.

Figure 1:
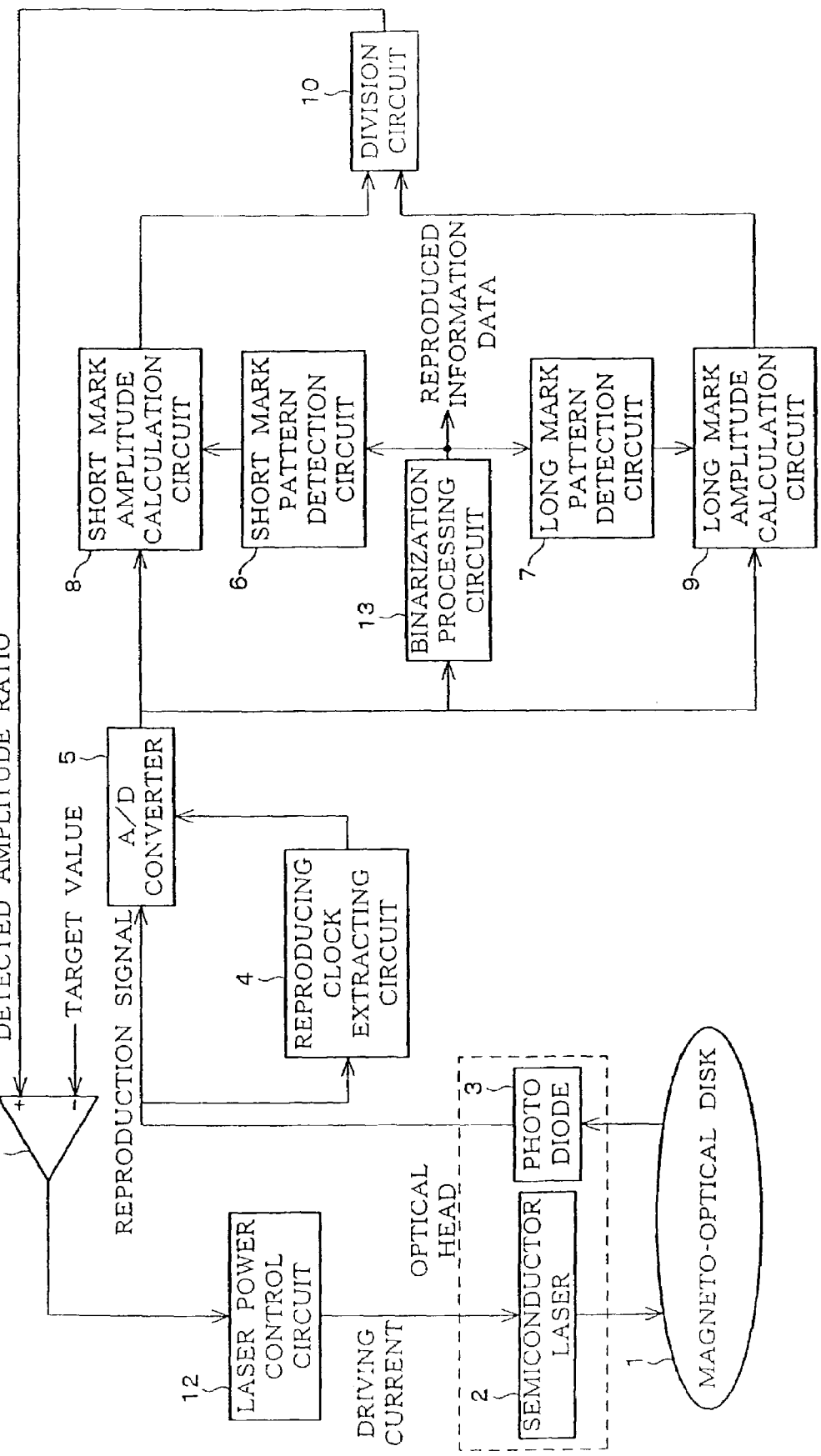
FIG. 1 is a structural view showing one embodiment of an optical reproducing device in accordance with the present invention.
Figure 5:
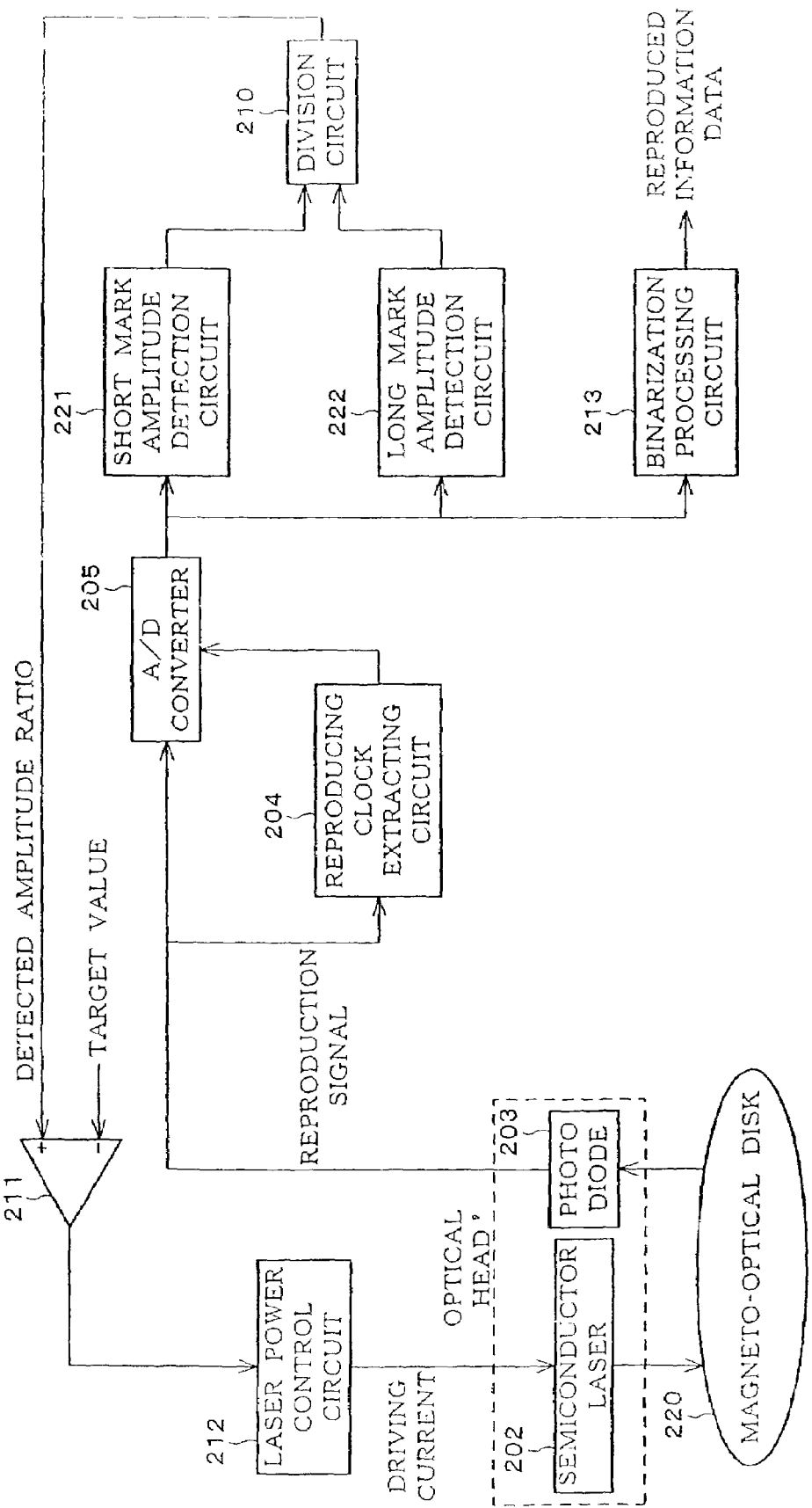
FIG. 5 is a structural view showing a conventional optical reproducing device.
Figure 6:
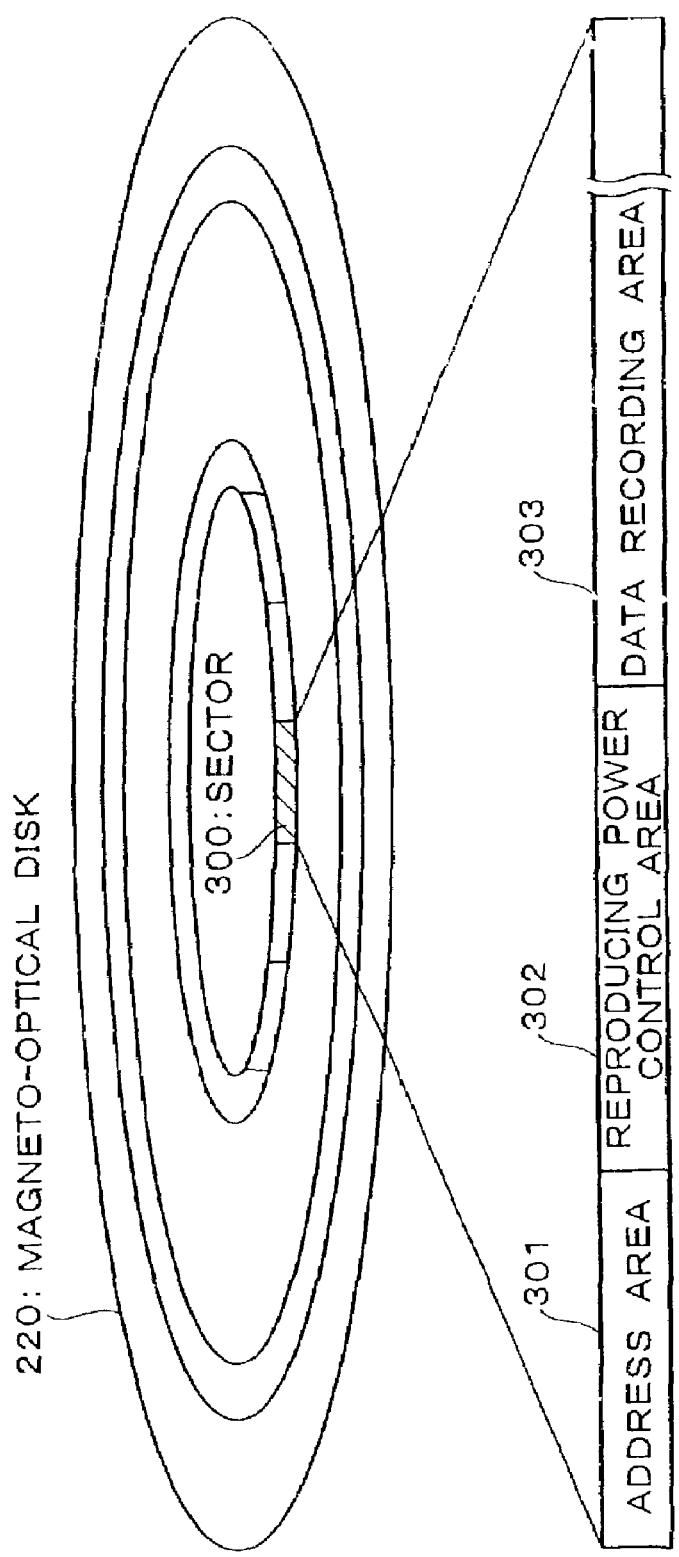
FIG. 6 is a schematic view showing a structure of a magneto-optical disk reproduced by the conventional optical reproducing device.
Figure 7A:
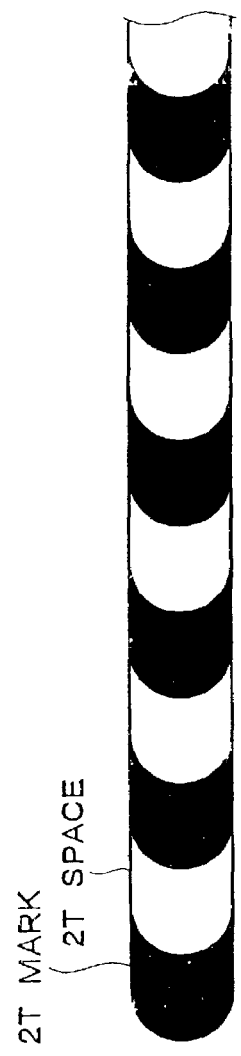
FIGS. 7(a) and 7(b) are schematic views showing a short mark pattern and a long mark pattern recorded in a reproducing power control area on the foregoing magneto-optical disk.
Figure 7B:
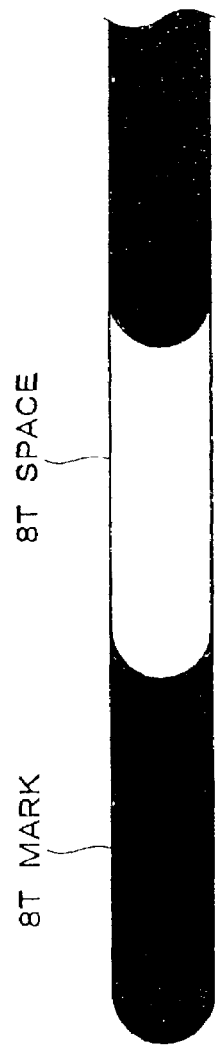
Figure 9:
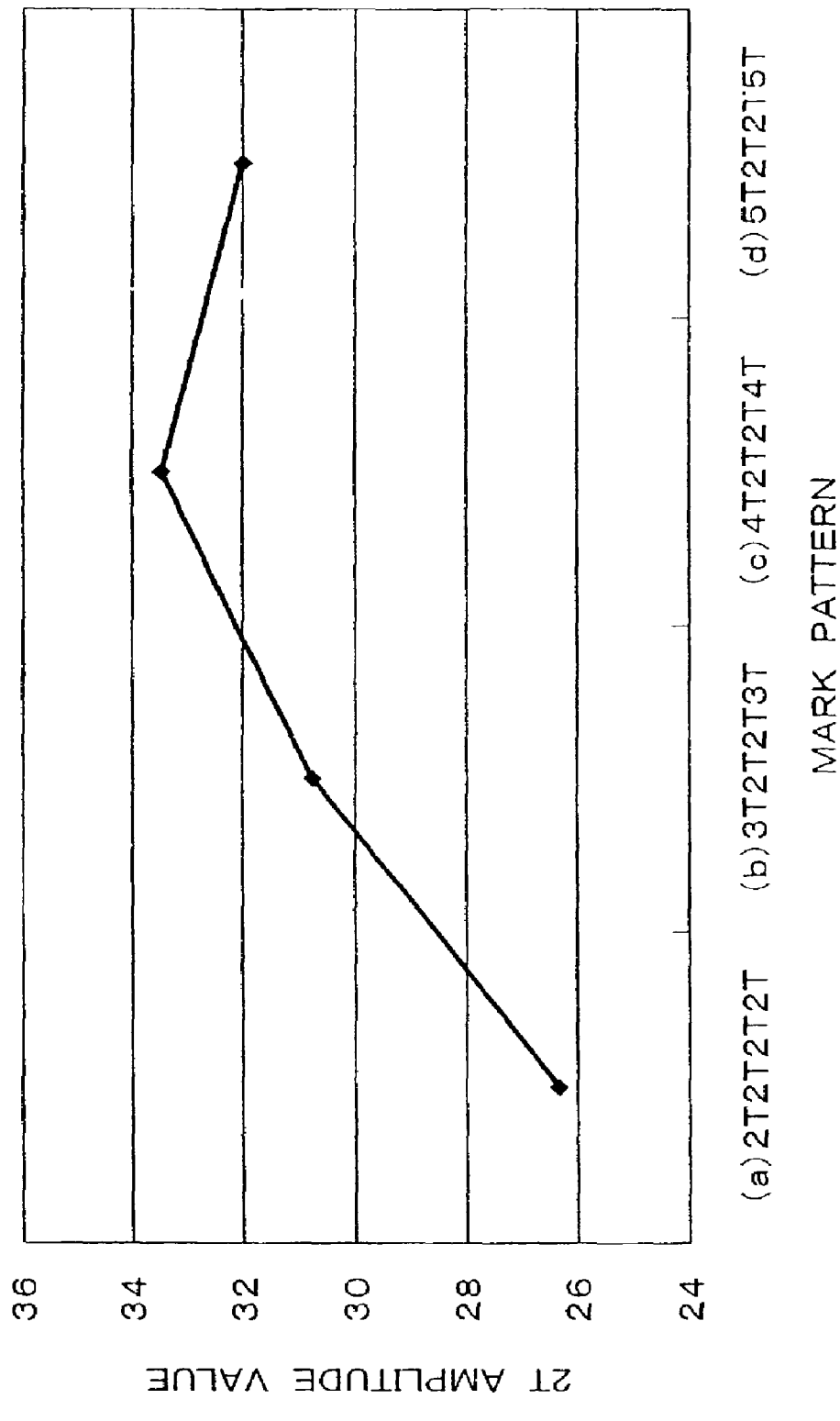
FIG. 9 is a graph showing a result in which differences in 2T amplitude values depending on the lengths of marks before and after the 2T mark are confirmed by an actual measurement using reproduction signals.

As shown in FIG. 1, a magneto-optical disk reproducing device as an optical reproducing device of the present embodiment is structured so as to include a semiconductor laser 2, a photo diode 3, a reproducing clock extracting circuit 4, an A/D converter 5, a division circuit 10, a differential amplifier 11, a laser power control circuit 12, and a binarization processing circuit 13. Incidentally, the foregoing respective means are identical to those in the conventional device shown in FIG. 5. Besides, the semiconductor laser 2, the photo diode 3, the A/D converter 5, and the binarization processing circuit 13 have a function as data reproduction means of the present invention, and the differential amplifier 11 and the laser power control circuit 12 have a function as reproduction condition control means of the present invention. The laser power control circuit 12 also has a function as power control means of the present invention.

In addition to the foregoing means, the magneto-optical disk reproducing device of the present embodiment is further provided with a short mark pattern detecting circuit 6 for detecting a specific pattern including a 2T mark or short mark 103a from a reproduced information data pattern; a long mark pattern detection circuit 7 for detecting a specific pattern including an 8T mark or long mark 103b from an information data pattern in the same way; a short mark amplitude calculation circuit 8 for extracting an amplitude value of the 2T mark from an A/D conversion value of a reproduction signal corresponding to the specific pattern, every time the short mark pattern detection circuit 6 detects the specific pattern, and averaging the amplitude values; and a long mark amplitude calculation circuit 9 for extracting an amplitude value of the 8T mark from an A/D conversion value of a reproduction signal corresponding to the specific pattern every time the long mark pattern detection circuit 7 detects the specific pattern, and averaging the amplitude values. Note that the foregoing "T" represents a channel bit length, Incidentally, the short mark pattern detection circuit 6 and the long mark pattern detection circuit 7 have a function as comparison means of the present invention, and the short mark amplitude calculation circuit 8 and the long mark amplitude calculation circuit 9 have a function as signal measurement means of the present invention.

Figure 2:
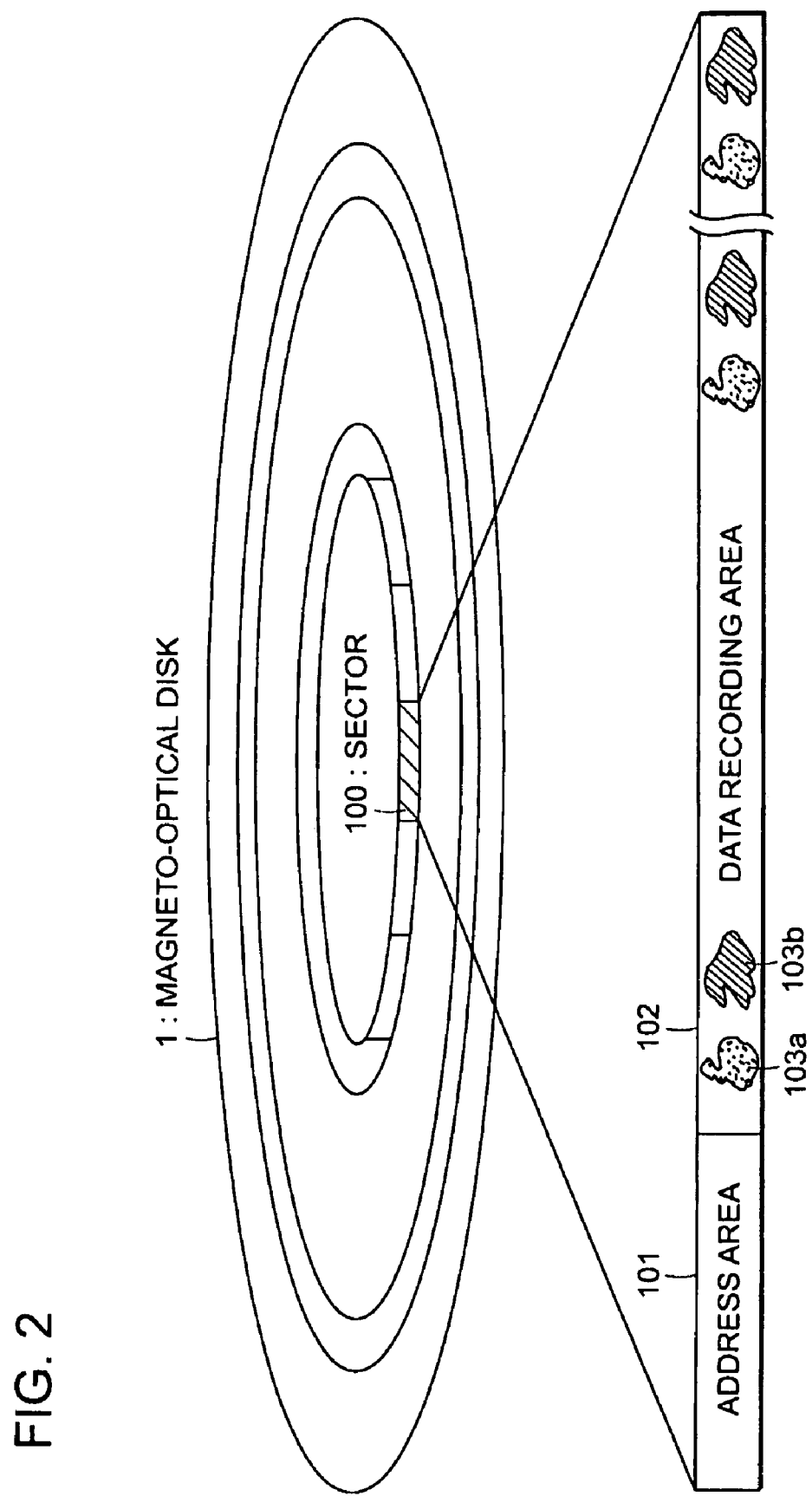
FIG. 2 is a schematic view showing a structure of a magneto-optical disk reproduced by the foregoing optical reproducing device.

Besides, a magneto-optical disk 1 as an optical recording medium is different from that used for a conventional technique: as shown in FIG. 2, a sector 100 does not have a reproducing power control area, and is structured so as to include an address area 101 and a data recording area 102 only. Therefore, with this structure, disk utilization ratio is improved.

The following description will explain a reproduction operation by the magneto-optical disk reproducing device structured as above.

First, as shown in FIG. 1, when light emitted from a semiconductor laser 2 reaches the address area 101 of the sector 100 on the magneto-optical disk 1, reflected light is converted by the photo diode 3 into an electric signal, and outputted as a reproduction signal. Thus, a target sector address is recognized by an address decoder (not shown), from the reproduction signal of the address area 101 obtained in such a manner.

Next, the emitted light is directed to the data recording area 102, then reflected light is inputted via the photo diode 3 and the A/D converter 5 to the binarization processing circuit 13, the short mark amplitude calculation circuit 8, and the long mark amplitude calculation circuit 9. The binarization processing circuit 13 decodes an original information data pattern expressed in binary notation using 0 and 1 and recorded in the data recording area 102, from a digital reproduction signal. The information data pattern is judged by the short mark pattern detection circuit 6 whether or not to coincide with the specific pattern including the 2T mark. The judgement result is monitored by the short mark amplitude calculation circuit 8, and when the information data pattern is judged to coincide with the specific pattern, a 2T mark amplitude value is obtained from a 2T mark reproduction signal included in a reproduction signal corresponding to the information data pattern.

Such processing is carried out all over the data recording area 102 of the sector 100, and obtained individual 2T mark amplitude values are averaged, and outputted as an average 2T mark amplitude value of the sector 100. Here, a pattern in which marks of predetermined lengths are provided before and after a pair of a 2T mark and a 2T space (hereinafter referred to as "2T2T"), that is, a pattern "mT2T2TnT" (where m and n are predetermined positive integers), is set as the specific pattern. Since the individual 2T mark amplitude values acquired with this arrangement are all obtained from reproduction signals of 2T2Ts @ (2T patterns each of which is the pair of the 2T mark and the 2T space and which are) respectively provided with marks of identical lengths before and after the 2T2Ts, the average 2T mark amplitude value obtained by averaging the individual 2T mark amplitude values comes to have very little dispersion.

In addition, since a mark smaller than an aperture diameter such as the 2T mark especially suffers from the influence by waveform interference, the foregoing effect becomes more pronounced. Further, it can be considered that a pattern where m=n=2, that is, a pattern 2T2T2T2T is more likely to occur than other patterns each having other m and n. Therefore, by setting the pattern 2T2T2T2T as the specific pattern, more 2T marks can be detected, further reducing the dispersion in the average 2T mark amplitude value.

Likewise, when the decoded information data pattern is judged by the long mark pattern detection circuit 7 to coincide with the specific pattern including the 8T mark, an 8T mark amplitude value is obtained by the long mark amplitude calculation circuit 9, and individual 8T mark amplitude values obtained all over the sector 100 are averaged and outputted as an average 8T mark amplitude value.

The average 2T mark amplitude value and the average 8T mark amplitude value obtained in such a manner are inputted to the division circuit 10 for division, and an amplitude ratio of the sector 100 is obtained.

From now on, in the same way as in the conventional device, reproducing power of the semiconductor laser 2 is controlled by the laser power control circuit 12 based on the amplitude ratio. However, in the present embodiment, as explained above, the dispersion in the 2T mark amplitude value is especially minimized. Consequently, an error in the controlled reproducing power is also minimized, achieving data reproduction with an extremely low error rate.

Next, more detailed explanation will be given on the structure and operation from detecting to averaging the 2T mark amplitude values in the foregoing structure.

Figure 3:
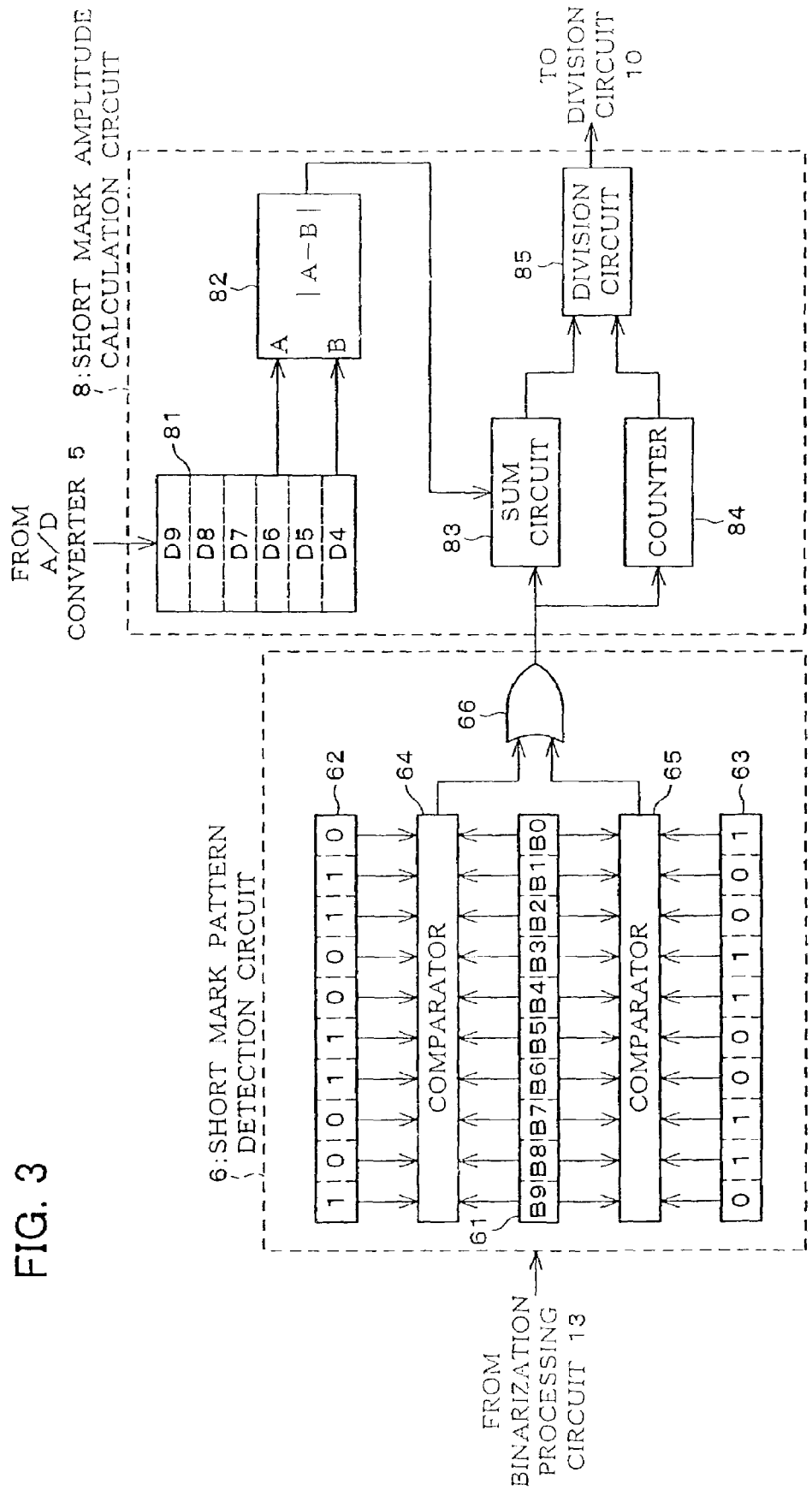
FIG. 3 is a structural view showing details of a short mark pattern detection circuit and a short mark amplitude calculation circuit in the foregoing optical reproducing device.

As shown in FIG. 3, the short mark pattern detection circuit 6 is structured so as to include a 10-stage 1-bit shift register 61 for sequentially storing the latest 10 bits of an information data bit outputted from the binarization processing circuit 13; a register 62 for storing "1001100110" as a specific pattern including the 2T mark; a register 63 for storing "0110011001" as another specific pattern including the 2T mark; a comparator 64 for comparing data stored in the 10-stage 1-bit shift register 61 and data stored in the register 62 per each bit and judging whether or not all the bits stored in the 10-stage 1-bit shift register 61 coincide with those stored in the register 62; a comparator 65 for judging whether all the bits stored in the 10-stage 1-bit shift register 61 coincide with those stored in the register 63 in the same way; and an OR circuit 66 for obtaining an OR of data in the comparators 64 and 65.

On the other hand, the short mark amplitude calculation circuit 8 is structured so as to include a 6-stage n-bit shift register 81 for sequentially storing the latest six n-bit reproduction signal data (where n is the number of a quantized bit in the A/D converter 5); a subtractor 82 for obtaining an absolute value |A-B| of a difference between inputted two values, for example, a value A and a value B; a sum circuit 83 for sequentially adding inputted data and obtaining the sum; a counter 84; and a division circuit 85.

In the short mark pattern detection circuit 6 and the short mark amplitude calculation circuit 8 structured as above, an information data bit row "B0, B1, . . . , B9" outputted from the binarization processing circuit 13 and stored in the 10-stage 1-bit shift register 61 is compared with "1001100110" stored in the register 62 by the comparator 64. At the same time, the information data bit row "B0, B1, . . . , B9" is also compared with "0110011001" stored in the register 63 by the comparator 65.

These comparison results are inputted to the OR circuit 66, and the OR of the both results is transmitted as a coincidence signal to the sum circuit 83 and the counter 84 in the short mark amplitude calculation circuit 8. That is, the coincidence signal is transmittd when the information data bit row "B0, B1, . . . , B9" coincides with either "1001100110" or "0110011001".

On the other hand, an n-bit digital data row "D4, D5, . . . , D9" of a reproduction signal outputted from the A/D converter 5 is sequentially stored in the 6-stage n-bit shift register 81 in synchronization with the 10-stage 1-bit shift register 61. Incidentally, as shown in FIGS. 4(*a*) through 4(*c*), D4, D5, ., D9 respectively represent digital data at sampling points corresponding to a reproduction signal waveform of the information data bits B4, B5, . . . B9.

Here, when stored data in the 10-stage 1-bit shift register 61 are B0, B1, . . . , in order of oldness, stored data in the 6-stage n-bit shift register 81 are D4, D5, . . . , in order of oldness. Then, an absolute value of a difference between the data D4 and the data D6 is obtained by the subtractor 82.

When the coincidence signal is transmitted from the OR circuit 66, the sum circuit 83 adds a value outputted from the subtractor 82 at that time, that is, |D4-D6|, and increments the counter 84 at the same time.

The foregoing processing is carried out all over the sector 100. With this arrangement, at the time when reproduction is completed to the end of the sector 100, the total sum of the 2T mark amplitude values of individual reproduction waveforms corresponding to all the specific patterns "1001100110" or "0110011001" included in the information data patterns in the sector 100 is stored in the sum circuit 83.

Besides, the total number of the specific patterns included in the sector 100 is stored in the counter 84. These figures are inputted to the division circuit 85 for division, and outputted from the short mark amplitude calculation circuit 8 as an average 2T mark amplitude value of the sector 100. Incidentally, as for the structure and operation from detecting to averaging the 8T mark amplitude values carried out by the long mark pattern detection circuit 7 and the long mark amplitude calculation circuit 9, detailed explanation will be omitted since they are the same in principle as those for the 2T mark amplitude values carried out by the short mark pattern detection circuit 6 and the short mark amplitude calculation circuit 8. However, in this case, specific patterns stored in registers in the long mark pattern detection circuit 7 are, for example, "011111111000000001" and "100000000111111110", respectively.

In this manner, it becomes possible to detect a specific pattern from reproduction information data after binarization processing, and surely obtain an amplitude value of a mark of a predetermined length from a reproduction signal corresponding to the specific pattern, so as to obtain an average amplitude value by averaging the amplitude values.

Incidentally, in the present embodiment, the short mark having a length of 2T and the long mark having a length of 8T are used, but it is needless to say that the present invention is not limited to this. It is sufficient to select the most appropriate mark lengths in consideration of the minimum mark length determined depending on a modulation scheme.

Besides, the foregoing explanation has been given on a case where the amplitude value of the 2T mark is obtained by sampling a reproduction waveform at a peak phase. However, the present invention is not limited to this. For example, when using the PRML (Partial Response Maximum Likelihood) detection method based on PR (1,2,1) characteristic as a binarization processing method, a sampling phase of a 2T mark reproduction waveform deviates from a peak by half a clock, and thus the present invention may be structured such that an amplitude is calculated by using values sampled from a waveform corresponding to a pair of 2T marks included in a specific pattern, sampled at two upper phases and two lower phases.

In the present embodiment, explanation has been given on a magneto-optical disk reproducing device as an example of an optical reproducing device, but an optical reproducing device of the present invention is not limited to this. The present invention may be applied to an optical reproducing device for reproducing such as an optical disk of the phase change type.

As described, in the magneto-optical disk reproducing device of the present embodiment, when reproducing a record mark smaller than a spot diameter of a light beam, in order to prevent fluctuations in an optimum reproducing power of the light beam due to changes in an ambient temperature during reproduction, amplitude values of reproducing power control marks respectively having short and long lengths, for example, a 2T mark and an 8T mark, are measured by predetermined length mark signal measurement means, from information data recorded on the magneto-optical disk 1. Then, the laser power control circuit 12 controls the reproducing power of the light beam based on the amplitude values.

Meanwhile, conventionally, a reproducing power control area is provided in each sector of the magneto-optical disk 1, and thus an area for recording the information data is reduced by the amount of the reproducing power control area, resulting in a reduction in the utilization ratio of the magneto-optical disk 1. Therefore, in order to solve the problem, it can be considered to detect a reproducing power control mark from a bit arrangement pattern of the information data. However, the bit arrangement pattern of the information data has various arrangement patterns. Besides, especially as for a reproducing power control mark having a length shorter than an aperture diameter, such as a 2T mark, an amplitude value of the 2T mark is influenced by waveform interference by reproducing power control marks provided before and after the 2T mark.

Consequently, in the present embodiment, "1001100110" or "0110011001" as a specific pattern including the 2T mark is detected from the bit arrangement pattern of the information data, and a 2T mark amplitude value corresponding only to "1100" or "0011" in the middle of the respective specific patterns is measured.

As a result, since the amplitude value corresponding only to the 2T mark is measured, this structure can avoid influence from before and after the 2T mark when measuring the amplitude value of the 2T mark. Consequently, this structure can prevent dispersion in a measured amplitude value of the short reproducing power control mark, resulting in preventing the reproducing power controlled based on the amplitude value from having a great error.

Therefore, this structure can provide a magneto-optical disk reproducing device which can maintain the reproducing power at an optimum value and reduce the probability of reading errors, without reducing the utilization ratio of the magneto-optical disk 1.

Besides, in the magneto-optical disk reproducing device of the present embodiment, information data bits are reproduced from a reproduction signal of the magneto-optical disk 1 by the semiconductor laser 2, the photo diode 3, the A/D converter 5, and the binarization processing circuit 13, and the short mark pattern detection circuit 6 compares a bit arrangement pattern of reproduced information data with the specific pattern "1001100110" including the 2T mark and the other specific pattern "0110011001" including the 2T mark, and detects the coincidence of the bit arrangement pattern and one of the specific patterns.

Then, the short mark amplitude calculation circuit 8 measures a 2T mark amplitude value of information data bits corresponding to the 2T mark included in the specific pattern "1001100110" including the 2T mark or the other specific pattern "0110011001" including the 2T mark, the specific patterns being detected by the short mark pattern detection circuit 6 to coincide with the bit arrangement pattern. Incidentally, likewise, by means of the long mark pattern detection circuit 7 and the long mark amplitude calculation circuit 9, an 8T mark amplitude value of information data bits corresponding to the 8T mark included in the specific patterns is measured.

With this arrangement, specific predetermined length mark signal measurement means can be structured.

In the magneto-optical disk reproducing device of the present embodiment, the 2T mark is a mark having a length of 2T (where T is a channel bit length). Besides, the specific pattern "1001100110" including the 2T mark and the other specific pattern "0110011001" including the 2T mark are constituted by a pattern having a length arrangement of mT·2T·2T·nT (where m and n are predetermined positive integers).

More specifically, the specific pattern "1001100110" including the 2T mark and the other specific pattern "0110011001" including the 2T mark include 2T2T, which is a pair of the 2T mark and the 2T space, that is, "1100" or "0011". Therefore, it becomes possible to detect 2T2T, that is, "1100" or "0011", required for the measurement of the 2T mark amplitude value, from the bit arrangement pattern of the information data, and to measure the 2T mark amplitude value corresponding only to the 2T mark included in the specific pattern.

In the magneto-optical disk reproducing device of the present embodiment, it is set as m=n=2. Therefore, the specific pattern is expressed as 2T·2T2T·2T.

This means that 2T2T, that is, "1100" or "0011", is provided in the middle, and 2T patterns, that is, "00" or "11", are provided before and after 2T2T.

When patterns before and after 2T2T are not 2T patterns, the 2T mark amplitude value is affected by waveform interference by the patterns before and after 2T2T. However, in the present embodiment, the 2T patterns are provided before and after 2T2T, which prevents influence caused by the patterns before and after 2T2T which are not the 2T patterns.

Besides, by determining a mark before and after the 2T mark to be the 2T mark which occurs most, more 2T marks can be detected. Therefore, also when an average value of reproduction signal characteristics of the obtained 2T marks is obtained and determined as a measured value, dispersion in the 2T mark amplitude value after averaging can be further minimized.

In the magneto-optical disk reproducing device of the present embodiment, the differential amplifier 11 and the laser power control circuit 12 which control a reproduction condition based on the measured 2T mark amplitude value and 8T mark amplitude value are further provided. Therefore, the reproducing power of the light beam can be surely controlled by the differential amplifier 11 and the laser power control circuit 12, based on the 2T mark amplitude value and the 8T mark amplitude value.

In the magneto-optical disk reproducing device of the present embodiment, a ratio between the amplitude values of the 2T mark and the 8T mark, the marks having short and long lengths, respectively, is measured by the predetermined mark signal measurement means, and the reproducing power of the light beam is controlled by the differential amplifier 11 and the laser power control circuit 12 so that the measured amplitude ratio gets close to a target value.

Therefore, with this structure, the reproducing power of the light beam can be correctly controlled specifically and with reliability.

As has been discussed in the first embodiment, in an optical reproducing device of the present invention, predetermined length mark signal measurement means includes:

data reproduction means for reproducing information data bits from a reproduction signal of an optical recording medium;

comparison means for comparing a bit arrangement pattern of information data reproduced by the data reproduction means with a specific pattern, and detecting coincidence; and signal measurement means for measuring a reproduction signal characteristic of information data bits corresponding to a short reproducing power control mark included in the specific pattern detected by the comparison means to coincide with the bit arrangement pattern.

Therefore, specific predetermined length mark signal measurement means can be structured.

In the optical reproducing device of the present invention, the short reproducing power control mark is a mark having a length of 2T (where T is a channel bit length), and the specific pattern is constituted by a pattern having a length arrangement of mT·2T·2T·nT (where m and n are predetermined positive integers).

Therefore, it becomes possible to detect 2T2T required for the measurement of the reproduction signal characteristic, and to measure the reproduction signal characteristic corresponding only to the short reproducing power control mark included in the specific pattern.

Besides, in the optical reproducing device of the present invention, it is set as m=n=2.

Therefore, 2T patterns are provided before and after 2T2T, which prevents influence caused by the patterns before and after 2T2T which are not the 2T patterns.

Besides, by determining a mark before and after the 2T mark to be the 2T mark which occurs most, more 2T marks can be detected. Therefore, also when an average value of reproduction signal characteristics of the obtained 2T marks is obtained and determined as a measured value, dispersion in the 2T mark amplitude value after averaging can be further minimized.

The optical reproducing device of the present invention further includes reproduction condition control means for controlling a reproduction condition based on measured reproduction signal characteristics.

Therefore, the reproducing power of the light beam can be surely controlled by the reproduction condition control means based on the reproduction signal characteristics.

In the optical reproducing device of the present invention, the predetermined mark signal measurement means measures a ratio between the amplitude values of the reproducing power control marks having short and long lengths, respectively, and the reproduction condition control means controls the reproducing power of the light beam so that the measured amplitude ratio gets close to a target value.

Therefore, with this structure, the reproducing power of the light beam can be correctly controlled specifically and with reliability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical reproducing device comprising:
predetermined length mark signal measurement means for measuring reproduction signal characteristics respectively of a short reproducing power control mark and of a long reproducing power control mark from information data that are recorded in a data recording area of a sector of an optical recording medium; and
power control means for controlling reproducing power of a light beam based on the measured reproduction signal characteristics of the short and long reproducing power control marks,
wherein the predetermined length mark signal measurement means further includes a pattern detection means for detecting a specific pattern including therein an arrangement of a plurality of short reproducing power control marks from amongst a bit arrangement pattern of the information data in the data recording area, and when the specific pattern is detected, to measure the reproduction signal characteristic of short reproducing power control marks, the measured reproduction signal characteristic of short reproducing power control marks corresponding only to the plurality of short reproducing power control marks included in the specific pattern.

2. The optical reproducing device of claim 1 wherein:
the short reproducing power control mark is a mark having a length of 2T (where T is a channel bit length), and the specific pattern is constituted by a pattern having a length arrangement of mT 2T 2T nT (where m and n are predetermined positive integers).

3. The optical reproducing device of claim 2, wherein m=n=2.

4. The optical reproducing device of claim 3, wherein the power control means further includes reproduction condition control means for controlling a reproduction condition based on the measured reproduction signal characteristics.

5. The optical reproducing device of claim 4, wherein:
the predetermined length mark signal measurement means measures a ratio between amplitude values of the short and long reproducing power control marks; and
the reproduction condition control means further controls the reproducing power of the light beam so that the measured amplitude ratio gets close to a target value.

6. The optical reproducing device of claim 2, wherein the power control means further includes reproduction condition control means for controlling a reproduction condition based on the measured reproduction signal characteristics.

7. The optical reproducing device of claim 6, wherein:
the predetermined length mark signal measurement means includes a division circuit arranged to measure a ratio between amplitude values of the short and long reproducing power control marks; and
the reproduction condition control means further controls the reproducing power of the light beam so that the measured amplitude ratio gets close to a target value.

8. The optical reproducing device of claim 1, wherein said power control means further includes reproduction condition control means for controlling a reproduction condition based on the measured reproduction signal characteristics.

9. The optical reproducing device of claim 8, wherein:
the predetermined length mark signal measurement means includes a division circuit arranged to measure a ratio between amplitude values of the short and long reproducing power control marks; and
the reproduction condition control means further controls the reproducing power of the light beam so that the measured amplitude ratio gets close to a target value.

10. An optical reproducing device comprising:
predetermined length mark signal measurement means for measuring reproduction signal characteristics respectively of a short reproducing power control mark and of a long reproducing power control mark recorded in a data recording area of a sector of an optical recording medium;
power control means for controlling reproducing power of a light beam based on the measured reproduction signal characteristics of the short and long reproducing power control marks
wherein the predetermined length mark signal measurement means includes:
data reproduction means for reproducing information data bits from a reproduction signal of the optical recording medium;
comparison means for comparing a bit arrangement pattern of the information data reproduced by the data reproduction means with a specific pattern including an arrangement of a plurality of short reproducing power control marks, the comparison means including a pattern detecting means for detecting a coincidence of the specific pattern of the plurality of short reproducing marks in the bit arrangement pattern of the information data; and
signal measurement means for measuring the reproduction signal characteristic of information data bits corresponding to the plurality of short reproducing power control marks, when the comparison means detects the bit arrangement pattern of the information data coincides with the specific pattern including the plurality of short reproducing power control marks.

11. The optical reproducing device of claim 10, wherein:
the short reproducing power control mark is a mark having a length of 2T (where T is a channel bit length), and the specific pattern is constituted by a pattern having a length arrangement of mT 2T 2T nT (where m and n are predetermined positive integers).

12. The optical reproducing device of claim 11, wherein m=n=2.

13. The optical reproducing device of claim 12, wherein the power control means further includes reproduction condition control means for controlling a reproduction condition based on the measured reproduction signal characteristics.

14. The optical reproducing device of claim 13, wherein:
the predetermined length mark signal measurement means measures a ratio between amplitude values of the short and long reproducing power control marks; and
the reproduction condition control means further controls the reproducing power of the light beam so that the measured amplitude ratio gets close to a target value.

15. The optical reproducing device of claim 11, wherein the power control means further includes reproduction condition control means for controlling a reproduction condition based on the measured reproduction signal characteristics.

16. The optical reproducing device of claim 15, wherein:
the predetermined length mark signal measurement means includes a division circuit arranged to measure a ratio between amplitude values of the short and long reproducing power control marks; and
the reproduction condition control means further controls the reproducing power of the light beam so that the measured amplitude ratio gets close to a target value.

17. The optical reproducing device of claim 10, wherein the power control means further includes reproduction condition control means for controlling a reproduction condition based on the measured reproduction signal characteristics.

18. The optical reproducing device of claim 17, wherein:
- the predetermined length mark signal measurement means includes a division circuit arranged to measure a ratio between amplitude values of the short and long reproducing power control marks; and
- the reproduction condition control means further controls the reproducing power of the light beam so that the measured amplitude ratio gets close to a target value.

19. The optical reproducing device of any of claims 1-12, wherein:
- a plurality of short and long reproducing control marks are recorded in the optical recording medium;
- the predetermined length mark signal measurement means measures the reproduction signal characteristics corresponding to each short reproducing mark and calculates an average value using the measured reproduction signal characteristics.

20. The optical reproducing device of any of claims 9-16, wherein:
- the predetermined length mark signal measurement means calculates an average value for each of the short and long reproducing marks using the measured reproduction signal characteristics; and
- the reproduction condition control means further controls the reproducing power of the light beam so that the calculated amplitude ratio based on the average amplitude values approaches a target value.

* * * * *